US011170350B2

(12) United States Patent
Majid et al.

(10) Patent No.: US 11,170,350 B2
(45) Date of Patent: Nov. 9, 2021

(54) SYSTEMS AND METHODS FOR MOBILE APPLICATION REQUESTS OF PHYSICAL FACILITIES

(71) Applicants:Mohammed Abdul Majid, South Riding, VA (US); Michael Freker, Denville, NJ (US); Maureen Jules, Leesburg, VA (US)

(72) Inventors: Mohammed Abdul Majid, South Riding, VA (US); Michael Freker, Denville, NJ (US); Maureen Jules, Leesburg, VA (US)

(73) Assignee: Verizon Media Inc., New York, NY (US)

( * ) Notice: Subject to any disclaimer, the term of this patent is extended or adjusted under 35 U.S.C. 154(b) by 208 days.

(21) Appl. No.: 13/897,438

(22) Filed: May 19, 2013

(65) Prior Publication Data
US 2014/0343980 A1    Nov. 20, 2014

(51) Int. Cl.
*G06Q 10/00* (2012.01)
*G06Q 90/00* (2006.01)

(52) U.S. Cl.
CPC ............. *G06Q 10/20* (2013.01); *G06Q 90/20* (2013.01)

(58) Field of Classification Search
CPC .. G06F 17/30194; G06Q 99/00; G06Q 10/06; G06Q 10/087; G06Q 10/20; G06Q 90/20
USPC ........................................................ 705/7.12
See application file for complete search history.

(56) References Cited

U.S. PATENT DOCUMENTS

| 5,724,261 | A  | * | 3/1998  | Denny   | G06Q 10/10  |
|           |    |   |         |         | 235/375     |
| 7,957,990 | B2 | * | 6/2011  | Hawkins | G06Q 10/06  |
|           |    |   |         |         | 705/29      |
| 2003/0084067 | A1 | * | 5/2003 | Obiaya  | G06Q 10/06  |
| 2004/0087273 | A1 | * | 5/2004 | Perttila | G01S 13/751 |
|           |    |   |         |         | 455/41.2    |
| 2007/0200712 | A1 | * | 8/2007 | Arneson | G06K 7/0008 |
|           |    |   |         |         | 340/572.8   |
| 2009/0243854 | A1 | * | 10/2009 | Scheid | G06Q 10/06  |
|           |    |   |         |         | 340/572.1   |

(Continued)

OTHER PUBLICATIONS

Dr. Su, Chuan Jun. Effective Mobile Asset Management Systems Using RFID and ERP Technology. (Year: 2009).*

*Primary Examiner* — Johnna R Loftis
(74) *Attorney, Agent, or Firm* — Bookoff McAndrews PLLC

(57) ABSTRACT

Systems and methods are disclosed for enabling users to request information or services relating to a physical facility. One method includes receiving, from a device associated with a user, one or more of: a request to receive information about an asset or component of the facility, and a request to receive maintenance of an asset or component of the facility, wherein the request includes an identifier associated with the user and an identifier associated with the asset or component of the facility; accessing, based on the request, a database storing one or more user identifiers and one or more identifiers associated with a plurality of assets or components of the facility; and transmitting, to the device associated with the user, either a presentation of information about the asset or component of the facility, or a representation of a ticket for initiating maintenance of the asset or component of the facility.

20 Claims, 15 Drawing Sheets

(56) References Cited

U.S. PATENT DOCUMENTS

| | | | |
|---|---|---|---|
| 2012/0123951 A1* | 5/2012 | Hyatt | G06Q 10/10 |
| | | | 705/305 |
| 2012/0271673 A1* | 10/2012 | Riley | 705/7.12 |
| 2014/0006241 A1* | 1/2014 | Robb et al. | 705/35 |
| 2014/0172479 A1* | 6/2014 | Gallagher et al. | 705/7.15 |
| 2015/0112704 A1* | 4/2015 | Braun | G06Q 10/0631 |
| | | | 705/2 |

* cited by examiner

SYSTEMS AND METHODS FOR MOBILE APPLICATION REQUESTS OF PHYSICAL FACILITIES

TECHNICAL FIELD

Various embodiments of the present disclosure relate generally to increasing productivity and accessibility of resources in a physical facility. More specifically, exemplary embodiments of the present disclosure relate to systems and methods for reducing an individual's time spent on accessing information or making a request relating to a facility, and improving the accuracy and efficiency in fulfilling a request via mobile communication.

BACKGROUND

In any facility, such as an office building, apartment building, commercial building (e.g., mall), sporting/music venue, or the like, people often find themselves desiring information about the facility and/or desiring to submit a request relating to their interaction with the facility. For example, people may desire information about where various rooms, stores, or amenities are located. In addition, or alternatively, people might desire to submit various requests, such as requests to have certain facilities repaired, or to reserve portions of a facility for private use. As a result, building managers traditionally erected physical directories, or distributed paper directories that individuals could consult to explore the facility. Also, management would traditionally implement procedures for making requests, such as by filling out a request form with a facilities department, or submitting a conference room request form, etc.

In the context of commercial buildings, in particular, many employers implement programs to train employees on how to submit request forms to address various issues. In addition to the time and expense spent on these training programs, the actual request may take time being submitted to the appropriate department and may lack sufficient specificity for the request to be implemented. In the meantime, or instead of sending the request, the employee may spend time attempting to resolve the request on his or her own. This may result is a loss of employee productivity and/or an inaccurate or incomplete resolution to the initial request. For example, an employee may wish to report a problem with his or her printer to the information technology (IT) department of his or her employer. In order to do this, the employee may have to make a call, compose an email, and/or fill out a form making a request; wait to communicate with an IT officer; and check back with the IT officer to obtain the status of the request. These steps may take a significant amount of time, reducing employees' happiness and productivity, and may result in the request not being timely completed.

Accordingly, a need exists for systems and methods for facilitating accurate, efficient and rapid processing of facilities requests. The present disclosure is directed to, among other things, improving an experience and reducing an amount of time spent on making a facilities request, and to improving the accuracy of fulfilling a request via mobile communication.

SUMMARY OF THE DISCLOSURE

According to certain embodiments, a computer-implemented method is disclosed for enabling users to request information or services relating to a physical facility, the method comprising: receiving, from a device associated with a user, a request for information or services relating to a physical facility, the request being one or more of: a request to receive information about an asset or component of the facility, and a request to receive maintenance of an asset or component of the facility, wherein the request includes an identifier associated with the user and an identifier associated with the asset or component of the facility; accessing, based on the received request, a database storing one or more user identifiers and one or more identifiers associated with a plurality of assets or components of the facility; if the request is a request for information about an asset or component of the facility, generating a presentation of information about the asset or component, the information including data or photos stored in the database in relation to an identifier associated with the asset or component; if the request is a request for maintenance of an asset or component of the facility, generating a ticket for initiating maintenance of the asset or component, and storing the ticket in the database in relation to an identifier associated with the asset or component; and transmitting, to the device associated with the user, either the presentation of information about the asset or component of the facility, or a representation of the ticket for initiating maintenance of the asset or component of the facility.

According to certain embodiments, a system is disclosed for enabling users to request information or services relating to a physical facility, the system comprising: a memory storage device storing instructions for enabling users to request information or services relating to a physical facility; and one or more processors configured to execute the instructions to perform a method including: receiving, from a device associated with a user, a request for information or services relating to a physical facility, the request being one or more of: a request to receive information about an asset or component of the facility, and a request to receive maintenance of an asset or component of the facility, wherein the request includes an identifier associated with the user and an identifier associated with the asset or component of the facility; accessing, based on the received request, a database storing one or more user identifiers and one or more identifiers associated with a plurality of assets or components of the facility; if the request is a request for information about an asset or component of the facility, generating a presentation of information about the asset or component, the information including data or photos stored in the database in relation to an identifier associated with the asset or component; if the request is a request for maintenance of an asset or component of the facility, generating a ticket for initiating maintenance of the asset or component, and storing the ticket in the database in relation to an identifier associated with the asset or component; and transmitting, to the device associated with the user, either the presentation of information about the asset or component of the facility, or a representation of the ticket for initiating maintenance of the asset or component of the facility.

According to one embodiment, a computer-readable medium is disclosed that stores instructions that, when executed by a processor, cause the processor to execute a method for enabling users to request information or services relating to a physical facility, the method comprising: receiving, from a device associated with a user, a request for information or services relating to a physical facility, the request being one or more of: a request to receive information about an asset or component of the facility, and a request to receive maintenance of an asset or component of the facility, wherein the request includes an identifier associated with the user and an identifier associated with the asset or component of the facility; accessing, based on the received request, a database storing one or more user identifiers and one or more identifiers associated with a plurality of assets or components of the facility; if the request is a request for information about an asset or component of the facility, generating a presentation of information about the asset or component, the information including data or photos stored in the database in relation to an identifier associated with the asset or component; if the request is a request for maintenance of an asset or component of the facility, generating a ticket for initiating maintenance of the asset or component, and storing the ticket in the database in relation to an identifier associated with the asset or component; and transmitting, to the device associated with the user, either the presentation of information about the asset or component of the facility, or a representation of the ticket for initiating maintenance of the asset or component of the facility.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for improving an individual's or user's interaction with a facility and/or the people and services associated with the facility; to reducing an amount of time spent on making a request; and to improving the accuracy of fulfilling a facilities-related request via mobile communication.

According to embodiments of the present disclosure, a user may use a mobile device in communication with a wireless (Wi-Fi) router or a wireless network that is in communication with the Internet to submit a request for information or services. Although described herein as often pertaining to mobile devices and applications, it should be appreciated that the user may be operating any type of electronic device, whether mobile or not. In one embodiment, the user may submit the request to a server by submitting an image of the user's identifier (e.g., ID, workplace badge, or building badge), and/or an asset's, component's, or entity's identifier to a server via the Internet or other network. Based on the submitted identifier(s), the server may access a database to retrieve information regarding the user or entity associated with the identifier, and identify the user's location based on the leveraged Wi-Fi router or any other location-specific indicators. Alternatively, the location of the user may be identified using global positioning (GPS) coordinates of the user. The server may then prompt the user to submit a specific request based on the identified asset, component, or entity and/or location of the user. Once received, the server may process the request and provide the user with information regarding the status of the request and may also update any databases and/or provide other users information regarding the request.

Figure 1:
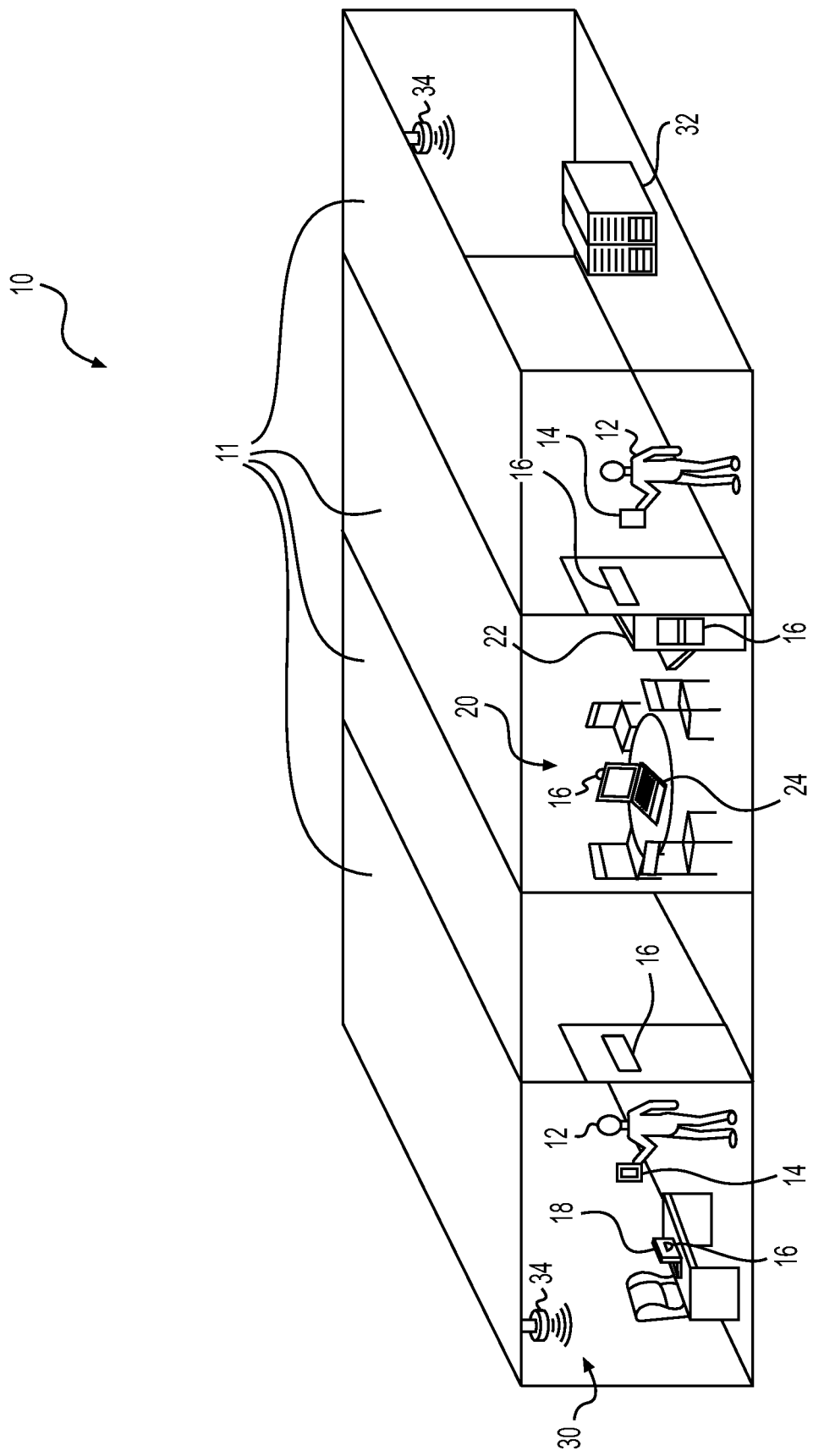
FIG. 1 is a schematic diagram of an environment in which a user may identify and submit information related to a request for information or services relating to a facility, according to an exemplary embodiment of the present disclosure.

Referring now to the figures, FIG. 1 is a schematic diagram of an environment in which a user may identify and submit information related to a request for information or services relating to a facility, according to exemplary embodiments of the present disclosure. Specifically, FIG. 1 depicts and environment or facility 10, which may be an office building, apartment building, commercial building (e.g., mall), sporting/music venue, or the like. In one embodiment, environment or facility 10 may be a workplace for a plurality of individuals or users 12 ("people," "individuals," and "users" are used interchangeably herein). In one embodiment, facility 10 may include one or more physical spaces or rooms 11. Of course, it should be appreciated that facility 10 may span any number of campuses, buildings, or cities. Facility 10 may be a complex network of buildings for a multi-national corporation spread around the globe. Alternatively, facility 10 may be as small as a single office.

As described above, facility 10 may be configured to enable users to identify and submit information related to a request for information or services relating to the facility. Accordingly, facility 10 may be provided with one or more systems, devices, and indicia with which users may interact to submit requests for information or services from those systems and devices. For example, facility 10 may be provided with a server system 32 provided in communication with one or more wireless access points (WAPs) 34. Server systems 32 may include databases and processors configured to execute methods of enabling users to request information or services relating to the facility. In addition, server systems 32 may include any number of servers relating to the facility and/or a business occupying the facility, such as helpdesk servers, Internet technology (IT) servers, human resources (HR) servers, employee servers, document management servers, etc., as will be described in more detail below.

In addition, one or more of users 12 (which may be owners and/or employees of the business(es) occupying the facility 10) may each possess one or more electronic devices 14, for interacting with the facility 10, and more specifically, for interacting with the server systems 32 and/or wireless access points 34. In one embodiment, the users' electronic devices 14 may be any type of mobile phone, personal data assistant (PDA), tablet, personal computer (PC), an electronic kiosk, or any other electronic device that may send and receive information via a wireless network, such as over the Internet or a local- or wide-area network ("LAN" or "WAN"). One or more of the electronic devices 14 may include an optical component configured to capture and/or recognize an image, and save and/or transmit the image via the Internet or a wireless network. For example, the optical component may be a camera, scanner, or any other suitable optical component. The electronic devices 14 may also be provided with a Bluetooth or other radio frequency communication protocol, and/or a near field communication (NFC) device, for communicating with other suitably-provisioned devices. Alternatively, or in addition to an optical component, the electronic devices 14 may include one or more audio and/or video components configured to capture and/or recognize a sound, series of sounds, and/or frame(s), and save and/or transmit the sound(s) and/or frame(s) via the wireless network. For example, an audio component may include a microphone, or any other suitable audio component, and a video component may include any type of camera.

In one embodiment, an optical component of each of electronic devices 14 may be used to capture and/or recognize an identifier or indicia 16 associated with any entity or asset of the facility 10, such as a user, a piece of equipment (e.g. printer 22, laptop 18, 24, tablet, television, desk, chair, etc.), a physical location (e.g. office building, conference room 20, office 30, etc.), or any other entity. The indicia 16 may be any machine-readable visual representation capable of being captured and/or scanned by an optical component of an electronic device 14. For example, the indicia 16 may be a one, two, or three dimensional barcode, or any other visual identifier. Alternatively, the indicia 16 may include alphanumeric indicia, such as a name, room number, serial number, etc., which the electronic device 14 or related device or module may decode or otherwise recognize as indicative of the entity or asset of the facility 10. In one embodiment, the indicia 16 may be associated with an entity or asset, and the association may be saved in retrievable memory, such as on a computer readable medium associated with server systems 32.

Figure 2:
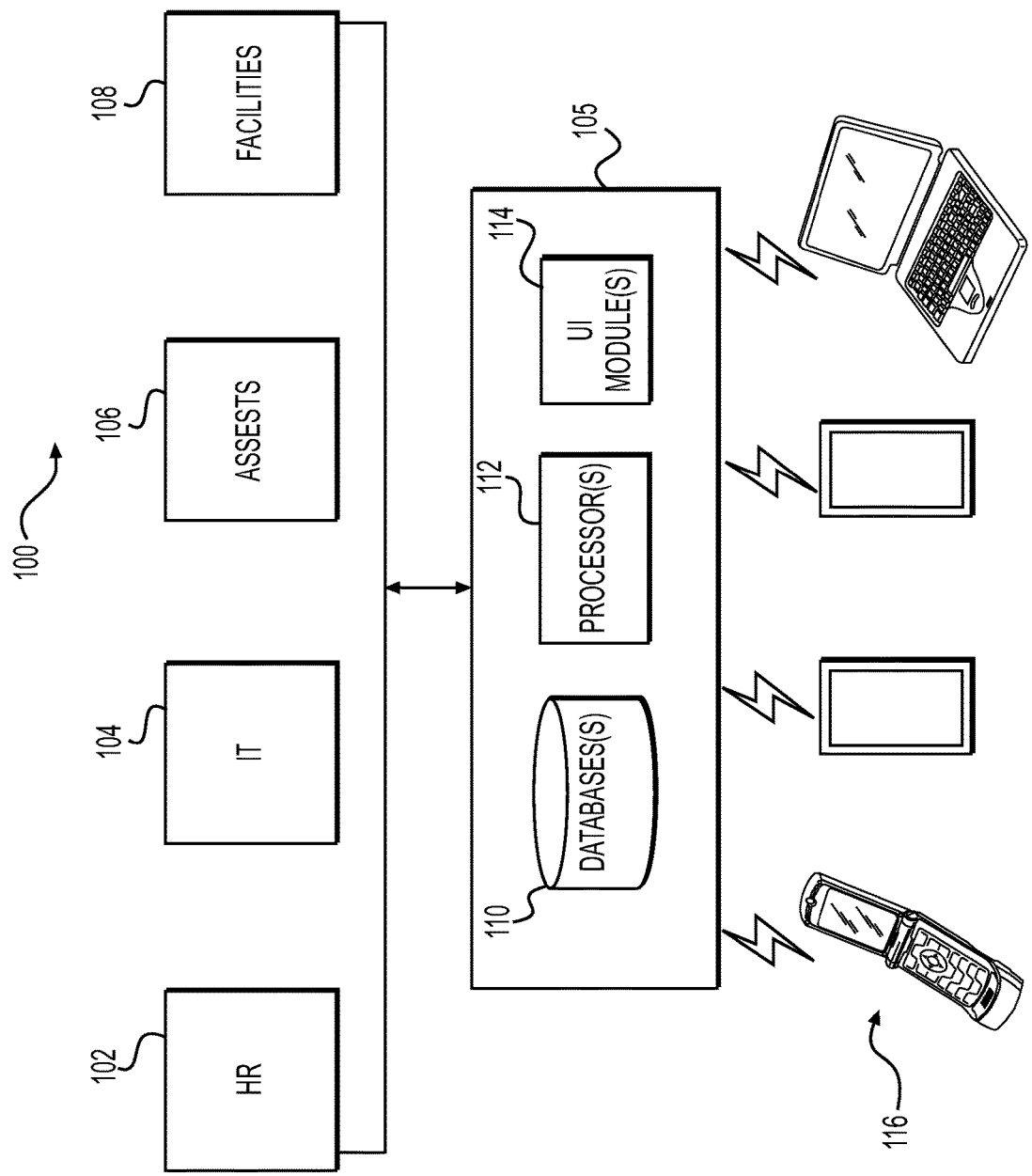
FIG. 2 is a diagram of a system configured to enable users to identify and submit information related to a request for information or services relating to a facility, according to an exemplary embodiment of the present disclosure.

FIG. 2 is a diagram of a system 100 configured to enable users to identify and submit information related to a request for information or services relating to a facility, according to an exemplary embodiment of the present disclosure. In one embodiment, system 100 may include one or more of HR server systems 102, information or Internet technology (IT) server systems 104, asset management server systems 106, and facilities server systems 108. System 100 may further include a mobile facilities request server system 105, which may include one or more databases 110, processors 112, and/or user interface (UI) modules 114. System 100 may further include or be provided in communication with a plurality of user devices 116. As described above, user devices 116 may correspond to one or more of user devices 14, which may be any type of mobile phone, personal data assistant (PDA), tablet, personal computer (PC), an electronic kiosk, or any other electronic device that may send and receive information via a wireless network, such as over the Internet or a local- or wide-area network. In addition, mobile facilities request server system 105 may correspond to server systems 32 provided in communication with one or more wireless access points (WAPs) 34 within a facility 10, and users may interact with mobile facilities request server system 105 via any electronic devices 14, 116.

In one embodiment, a record of an association of an identifier of an asset or entity saved in memory may be located in one or more locations based on one or more characteristics of the entity. These locations may be servers or other suitable devices configured to house and access computer readable memory. For example, in an organization, such as a large corporation, educational organization, government agency, etc., a separate server may store information for a particular department. In the exemplary example shown in FIG. 2, an organization may have a network with separate servers, such as the Human Resources (HR) server 102, configured to store, share, and update, information regarding employees; the Information Technology server 104, configured to store, share, and update information regarding electronic equipment and requests to repair electronic equipment; the assets server 106, configured to store, share, and update information regarding physical property; and/or the facilities server 108, configured to store, share, and update information regarding various buildings and offices that are part of the organization.

The servers may communicate with one or more servers, such as the request server 105, having database(s) 110, processor(s) 112, and user interface module(s) 114, via any local or wide area network. The communication may be through wires or wirelessly via the Internet or local area network, or any other suitable means. The servers, such as a request server 105, may receive and transmit information from devices, such as mobile devices 116 and other devices that may connect to the request server 105. Each server, such as HR server 102, IT server 104, assets server 106, and/or building facilities server 108, may communicate directly with each other via the network 100 or through a server or servers, such as the request server 105, or any other server.

In one embodiment, database(s) 110 may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. In addition, processor(s) 112 may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface module(s) 114 may include any type or combination of programs for generating user interfaces displayed on devices 116, including but not limited to any input/output devices, such as a display monitor, touchpad, touchscreen, microphone, camera, keyboard, and/or mouse. In one embodiment, UI module(s) 114 may be configured to implement any number or type of user interfaces, whether tailored for desktop PC or mobile device implementation, including but not limited to the user interfaces described below with respect to FIGS. 5-8E.

In one embodiment, HR server systems 102 may be configured to implement any number or type of systems configured to manage people or employees, such as individual location information, demographic information, individual desk or office information, individual photographs, individual home addresses, individual equipment assignments, etc. Information or Internet technology (IT) server systems 104 may be configured to implement any number or type of systems configured to manage and store individual IT assignments, such as computer, printer, or mobile device assignments, including device IDs (e.g., MAC ID or serial numbers), an IT profile, a search and/or browsing history, a clearance/accessibility level, etc. Asset management server systems 106 may be configured to implement any number or type of systems configured to manage and store information relating to any asset, equipment, or component of a facility, such as printer, computer, wireless access point, lab equipment, server, display, projector, television, or any other device or system considered to be an asset of the facility. Facilities server systems 108 may be configured to implement any number or type of systems configured to manage and store information relating to a component of a facility, such as a facility floorplan, campus map, global map, facility map, equipment map, amenities map, facility amenities map, and so on. Any one or more of HR servers 102, IT servers 104, asset servers 106, and facilities servers 108 may be configured to store information relating to requests, generate presentations of information, generate tickets for initiating the performance of service or maintenance, and so on.

In one embodiment, mobile facilities request server system 105 may be configured to communicate with one or more of HR server systems 102, information or Internet technology (IT) server systems 104, asset management server systems 106, and facilities server systems 108 to perform the methods described herein, whether by wired or wireless communications. For example, mobile facilities request server system 105 may include one or more translators or application programming interfaces (APIs) configured to communicate with various types of known servers systems for managing assets, equipment, people, facilities, and so on. In addition, mobile facilities request server system 105 may be configured to facilitate interaction between user devices 116 and those server systems 102-108, whether directly or indirectly, and whether through the Internet or over local wireless networks.

Figure 3:
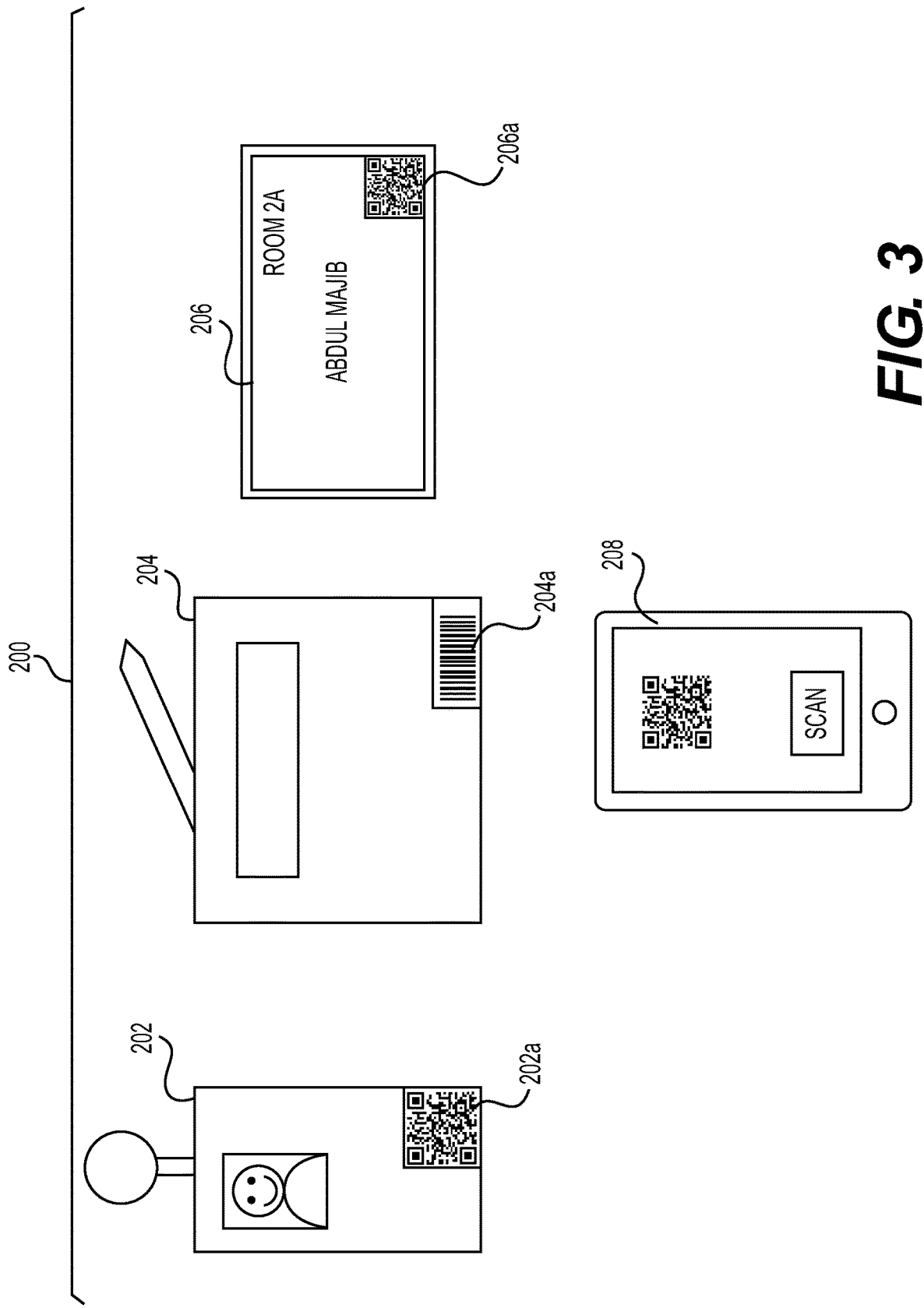
FIG. 3 is a schematic diagram of devices and indicia configured to enable users to identify and submit information related to a request for information or services relating to a facility, according to an exemplary embodiment of the present disclosure.

As described above, in one embodiment, user devices 116 may be configured to interact with a facility 10 through, among other means, imaging of indicia 16 (FIG. 1). Accordingly, in one embodiment, system 100 of FIG. 2 may be configured to operate in conjunction with exemplary indicia depicted in FIG. 3. FIG. 3 is a schematic diagram of devices and indicia 200 configured to enable users to identify and submit information related to a request for information or services relating to a facility, according to an exemplary embodiment of the present disclosure.

For example, as shown in FIG. 3, in one embodiment, a two-dimensional barcode 202a may be displayed on an ID badge 202 of a user, such as an employee of a company, or a student at an educational institution, or any other organization. Also shown in FIG. 3 are other examples of identifiers or indicia, such as a one-dimensional bar code 204a displayed on a surface of a piece of equipment, such as a printer 204, and a two-dimensional bar code 206a displayed on a name plate 206 of a user's office. As shown in FIG. 3, a mobile device 208 containing an optical component, e.g., a camera, may be used to capture an image of the identifier or indicia 202a, 204a, 206a, associated with the respective entity and transmit the image to a server for processing a request. Alternatively, device 208 may read and decode any indicia, or otherwise locally obtain one or more data elements or unique IDs from the indicia. In one embodiment, a user may scan his or her own badge 202, containing indicia 202a (e.g., a two-dimensional barcode or QR code) to log-in to a mobile application on the user's device 116. For example, the indicia 202a may contain a unique ID associated with the user's identity, whether in an HR database such as in an HR server 102, or otherwise. The user may then, once logged-in, easily interact, directly or indirectly, with assets and/or components of a facility 10 (e.g., assets 204 and/or indicia 206 of facilities) to make certain requests for information or services relating to those assets or facilities.

Figure 4:
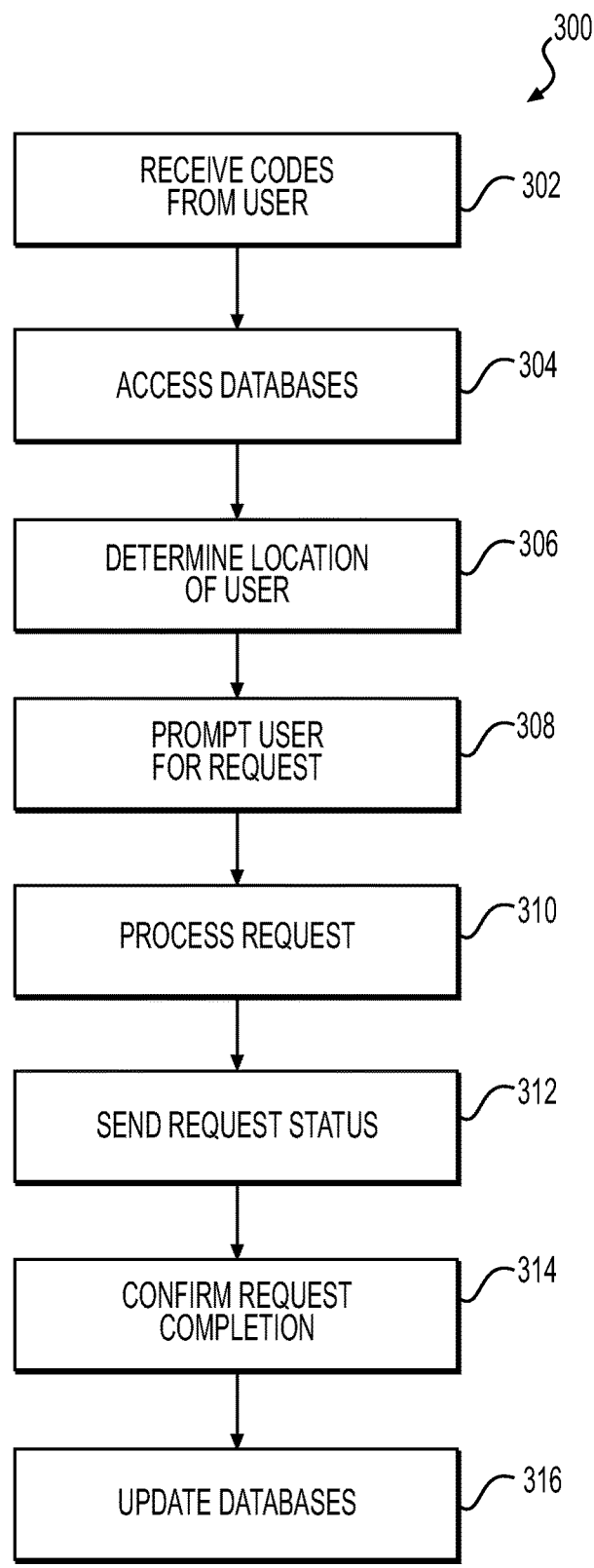
FIG. 4 is a flow diagram of an exemplary method for enabling users to identify and submit information related to a request for information or services relating to a facility, according to an exemplary embodiment of the present disclosure.

FIG. 4 is a flow diagram of an exemplary method for enabling users to identify and submit information related to a request for information or services relating to a facility, according to an exemplary embodiment of the present disclosure. Specifically, FIG. 4 is a flowchart of a method 300 for fulfilling a request, according to an exemplary embodiment consistent with embodiments of the present disclosure. At step 302, a server, such as request server 105, may receive, from a user via a mobile device 116, a communication regarding an entity. For example, the communication may be an image of the user's identification bar code 202a on the user's identification badge 202. In addition, or alternatively, the communication may be an image of an identifier associated with a piece of equipment, other user, or office, for example, an image of the bar code 204a of a printer 204, or bar code 206a of a room 206, or any other identifier.

Based on the image of the identifier received from the user's mobile device, the server, such as a request server 105, may access a database to retrieve information regarding the entity associated with the identifier (step 304). For example, the request server 105 may communicate with the HR server 102 to access information regarding the user, based on the user's identification bar code 202a.

At step 306, the request server 105 may determine the location of the mobile device 116 from which the image was sent. This location determination may be based, in part, on receiving information regarding the location of the wireless connection point that the mobile device 116 connected to in order to communicate with the request server 105. For example, if the user of the mobile device 116 accessed the network 100 by connecting to a stationary wireless port, such as a wireless router connected to the network, the server may determine that the user is in close proximity to the stationary wireless port. In addition to, or alternatively, the request server may determine the location of the user using global positioning (GPS) data of the mobile device 116. The location of the user may be used by the request server 105 to better facilitate the user's request.

At step 308, the request server 105 may prompt the user to submit a specific request, based on the information retrieved from the other servers. For example, in a manner as described above, the request server 105 may determine that the user is a new employee and has sent an image of an identifier associated with a printer. Based on this information, the user may send a message to the user via the mobile device 116, in the form of a text, email or other form of communication prompting the user to submit a request, and may provide a list of options, such as if the user would like to connect to the printer, if the user would like to report a problem with the printer, if the user would like further information about the printer etc. The user may then submit a request in response to the prompt via the mobile device 116 connected to the network 100.

At step 310, the request server may receive the request and process it, such as sending the request to the relevant entity to fulfill the request and or retrieve any information in the request for the relevant database. Prior to processing the request, the request server 105 may determine if the user is authorized to make the request. For example, the request server 105 may retrieve information about the user from a server, such as a HR server 102, based on the user's identifier. The HR server 102 may include information regarding the type of requests that user is authorized to make. For example, the HR server 102 may include various levels of security or permissions associated with each user and what type of requests the user may make using the network. Any suitable type or restrictions and categories may be associated with each user. These restrictions may be set by an administrator or any other suitable entity. For example, the request server may retrieve information about the user from the HR server 102 and determine, based on this information, that the user is not authorized to make the request. In this case, the request server 105 may send a communication to the user's mobile device 116, informing the user that they are not authorized to make the request. If the request server determines 105, based on information retrieved from the database(s), that the user is authorized to make the request, then the request may proceed to being processed at step 310.

Step 310 may include steps of sending and receiving communications, such as messages, information, instructions, etc., to servers, mobile devices, other users, etc., in order to fulfill the request. For example, referring to the previous example, if the user requests, via the mobile device 116, to print to a printer 204 connected to the network, the request server 105 may communicate with the IT server 104 and the assets server 106 to connect the mobile device 116 to the printer, 204, via the network.

At step 312, the request server may check the status of the request by communication with the relevant server and then provide a status communication to the user's mobile device 116 regarding the request. Once the request has been completed, the request server 105 may send a communication to the mobile device 116 at step 314, informing the user that the request has been completed. At step 316, the request server 105 may update any databases based on the fulfilled request.

In an example, in accordance with the present disclosure, the user may provide a request prior to sending an image of an identifier; therefore, the step or prompting the user for a request may be skipped. In another example, in accordance with the present disclosure, the user may provide a request at the same time as sending an image of the identifier and therefore the step of prompting the user for a request may be skipped.

Figure 5:
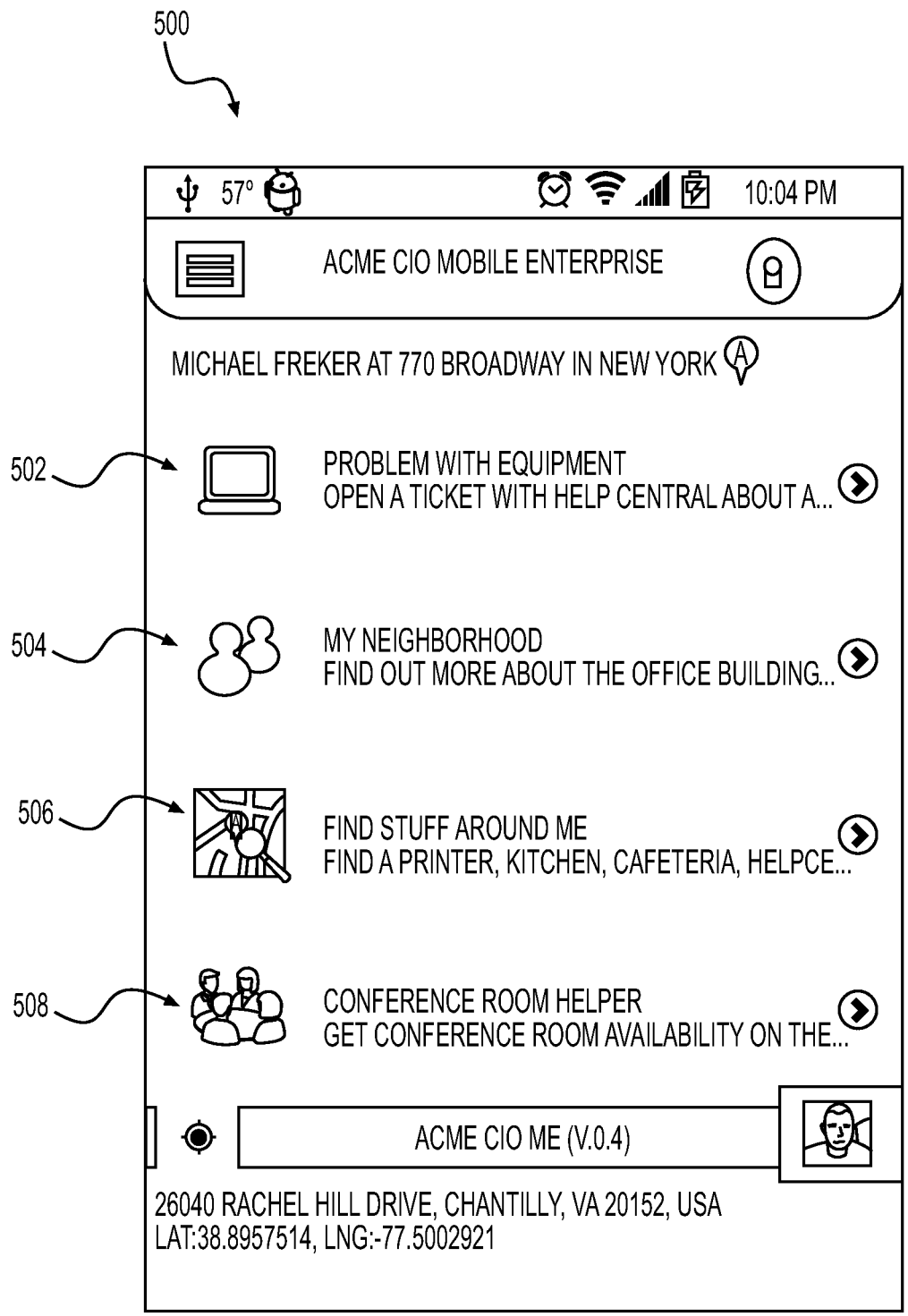
FIG. 5 is a screenshot of an exemplary mobile application for enabling users to identify and submit information related to a request for information or services relating to a facility, according to an exemplary embodiment of the present disclosure.

FIG. 5 is a screenshot of an exemplary mobile application for enabling users to identify and submit information related to a request for information or services relating to a facility, according to an exemplary embodiment of the present disclosure. Specifically, FIG. 5 depicts a mobile application interface 500 by which a user may submit information related to a request for information or services relating to a facility. For example, a user may be presented with one or more user elements 502, 504, 506, 508, which may be hyperlinks, buttons, or other mobile application elements that a user can select to initiate making a request for information or services. For example, as shown in FIG. 5, a user may manipulate user element 502 to issue a request for service relating to a "PROBLEM WITH EQUIPMENT." The user may manipulate user element 504 to issue a request for information relating to "MY NEIGHBORHOOD." The user may manipulate user element 506 to issue a request to "FIND STUFF AROUND ME." The user may manipulate user element 508 to issue a request for a "CONFERENCE ROOM HELPER." Of course, the indicated user elements are only exemplary of the many types of requests for information or services that may be implemented by a mobile application of a user device 116. When a user selects or otherwise manipulates one or more of user elements 502-508, the user's mobile device 116 may update its display with another presentation of information, forms, data, request options, etc. to further facilitate the user's request for information or services. In one embodiment, a combination of user elements 502-508 available/presented to a user may depend on a user's identity. Alternatively, a sub-menu or next screen displayed upon a user's selection of one of user elements 502-508 may depend on a user's identity.

Figure 6:
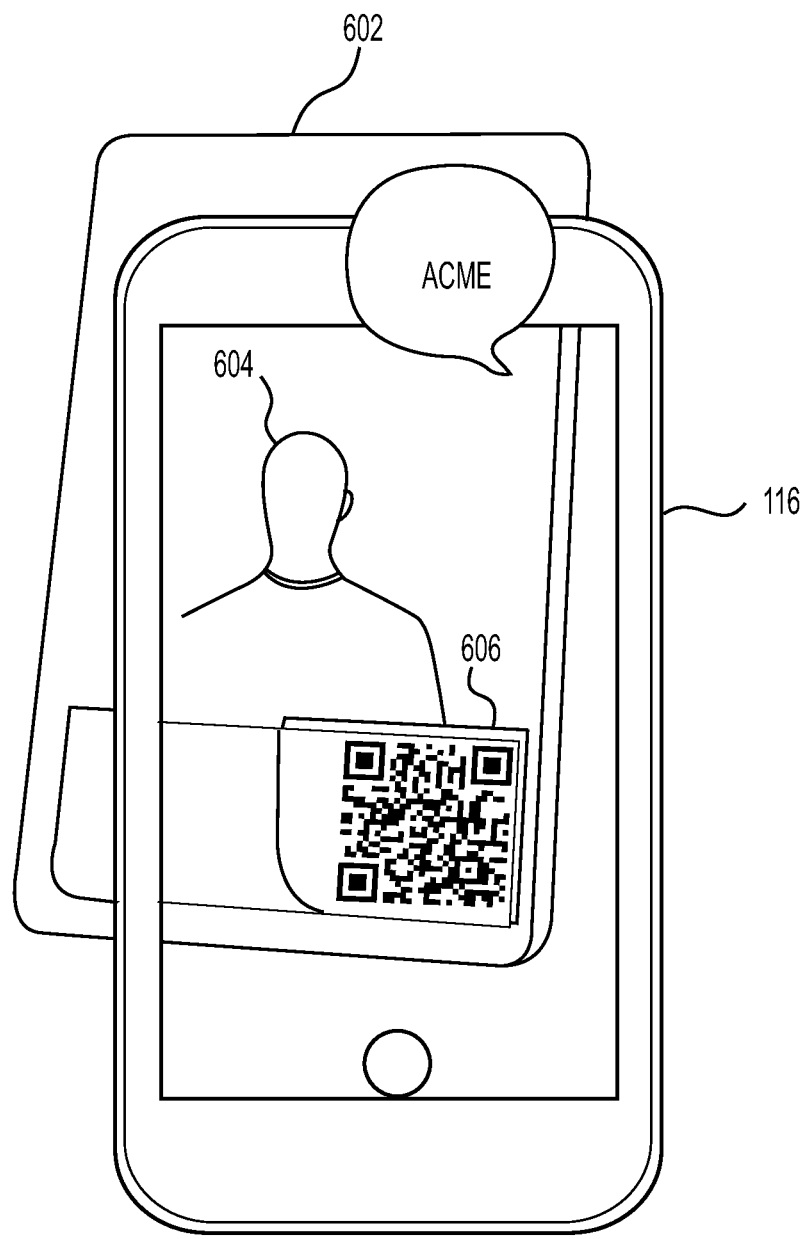
FIG. 6 is a schematic diagram of a device and indicia for enabling users to log-in to a mobile application for identifying and submitting information related to a request for information or services relating to a facility, according to an exemplary embodiment of the present disclosure.

Accordingly, FIG. 6 is a schematic diagram of a device and indicia for enabling users to log-in to a mobile application for identifying and submitting information related to a request for information or services relating to a facility, according to an exemplary embodiment of the present disclosure. Specifically, FIG. 6 depicts an embodiment in which a user may possess an ID card or badge 602 having, for example, a photograph, avatar, or other optional image 604, along with a machine-readable identifier or indicia 606. In one embodiment, as described above with respect to FIG. 3 (indicia 202*a* of badge 202), the indicia 606 may be a one or two dimensional barcode, such as, for example, a QR code. Thus, a user may operate his or her electronic device 116 (and a mobile application thereon) to capture an image of the indicia 606, or otherwise decode the indicia 606, to obtain at least a user identifier associated with the depicted user 604. Accordingly, a mobile application operating on electronic device 116 may identify a user (e.g., through the decoded unique ID), authenticate the user of the mobile application as being the owner of the electronic device 116, and tailor one or more presentations of data or generating of tickets based on the authenticated user identity.

Figure 7A:
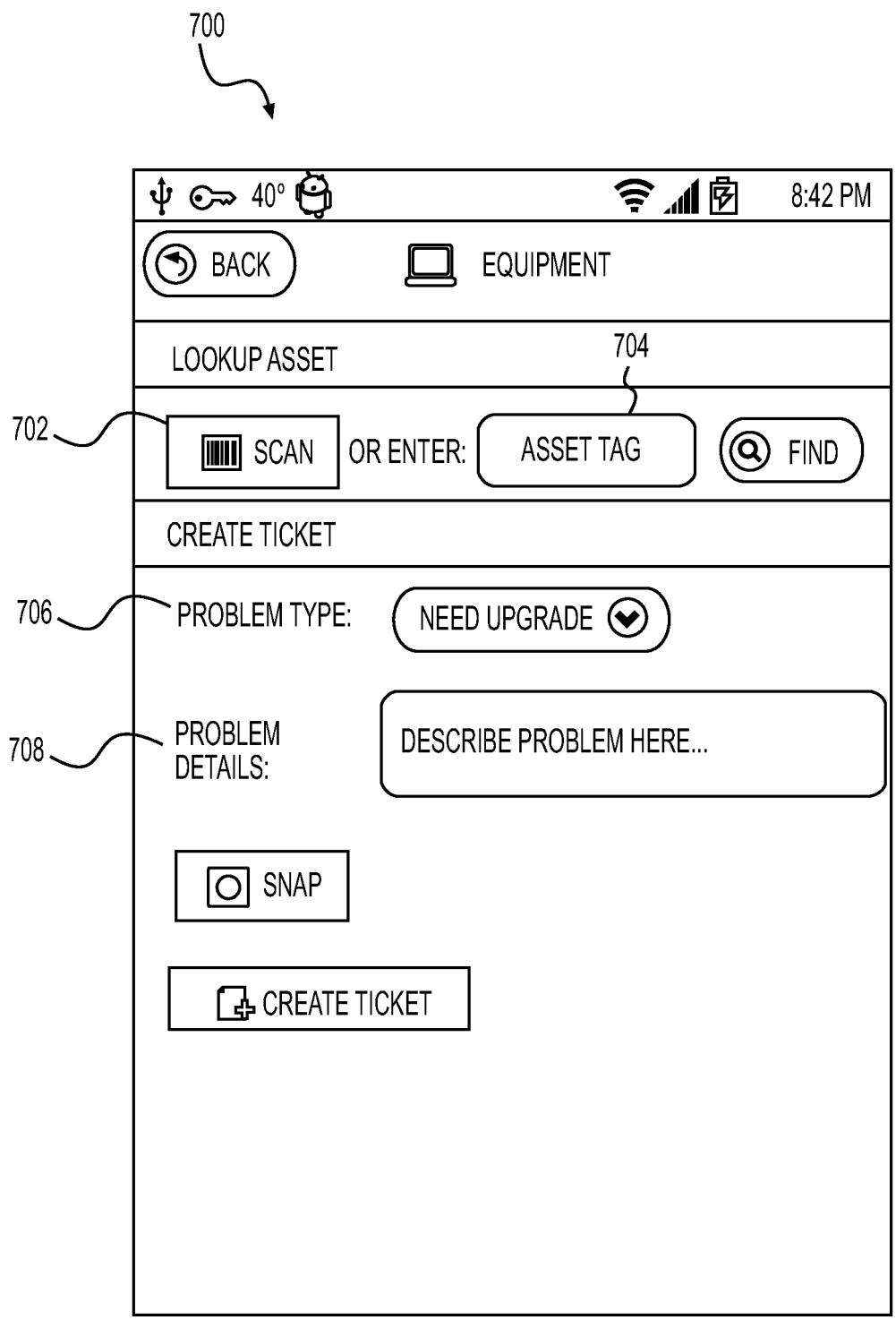
FIGS. 7A-7D are screenshots of an exemplary mobile application for enabling users to identify and submit information related to a request for services relating to a facility, according to an exemplary embodiment of the present disclosure.

FIGS. 7A-7D are screenshots of an exemplary mobile application for enabling users to identify and submit information related to a request for services relating to a facility, according to an exemplary embodiment of the present disclosure. Specifically, FIG. 7A is a screenshot of an exemplary mobile application interface 700 by which a user may submit a request for service relating to an asset or component of a facility. For example, a user may submit a request for service relating to a printer, fax machine, telephone, furniture, lab equipment, machine, tool, or any other asset within a facility. As shown in FIG. 7A, in one embodiment, a user may manipulate various user interface elements of interface 700 to generate and submit a request, for transmission through the user's electronic device 116.

For example, in one embodiment, the user may select element 702 to scan or otherwise image or decode machine-readable indicia printed on an asset. For example, the user may scan a barcode or QR code printed on a label of a piece of equipment, as shown with respect to the printer of FIG. 3. Alternatively, the user may select user element 704 to manually enter an asset tag or unique ID number using an alphanumeric keyboard of the user's device. In addition, as shown in FIG. 7A, a user may manipulate user element 706 to indicate a problem type, such as a malfunction of or damage to the selected equipment or asset. The user may also or alternatively type in a narrative description of a problem using user element or form 708.

Figure 7B:
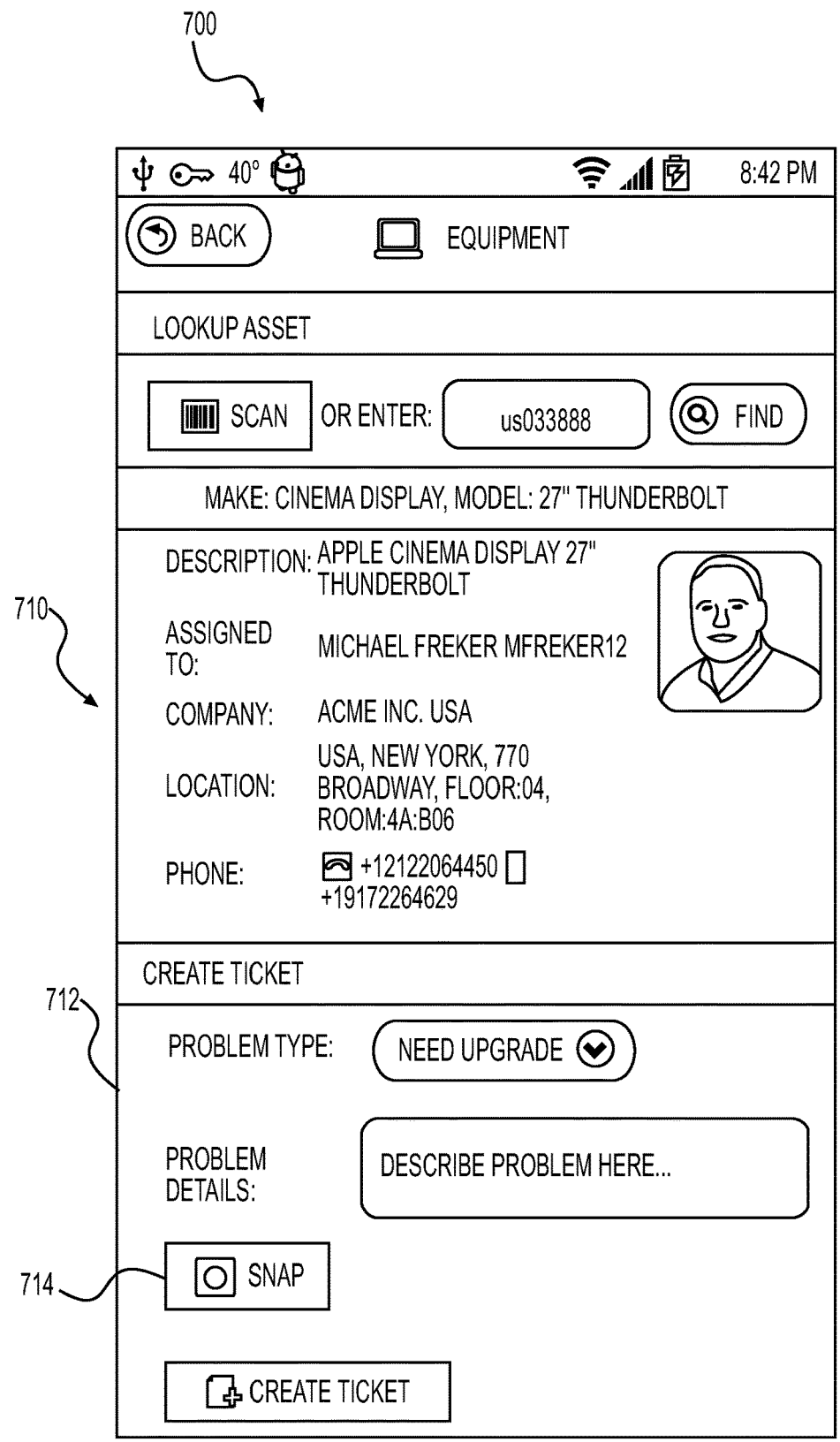

As shown in FIG. 7B, once a user has either successfully scanned an equipment or asset indicia, or manually entered an equipment or asset unique ID, the interface 700 may display profile information 710 associated with the equipment or asset. For example, profile information 710 may include a description of the asset or equipment; the name, number, ID, etc. of the individual to whom the asset or equipment is optionally assigned; a physical location of the asset or equipment (e.g., address, building number, room number, lat/long coordinates, etc.); and/or a phone number associated with a location or owner of the equipment or asset. As shown at ticket creation window 712, a user may enter a problem type, problem details, etc., and then manipulate user element 714 to snap a photograph of the equipment or asset to assist in locating, diagnosing, and/or repairing the subject asset or equipment. For example, as shown in FIG. 7C, the user may have uploaded a photograph 716 of a particular piece of equipment or asset for which the user is requesting information or service.

Figure 7C:
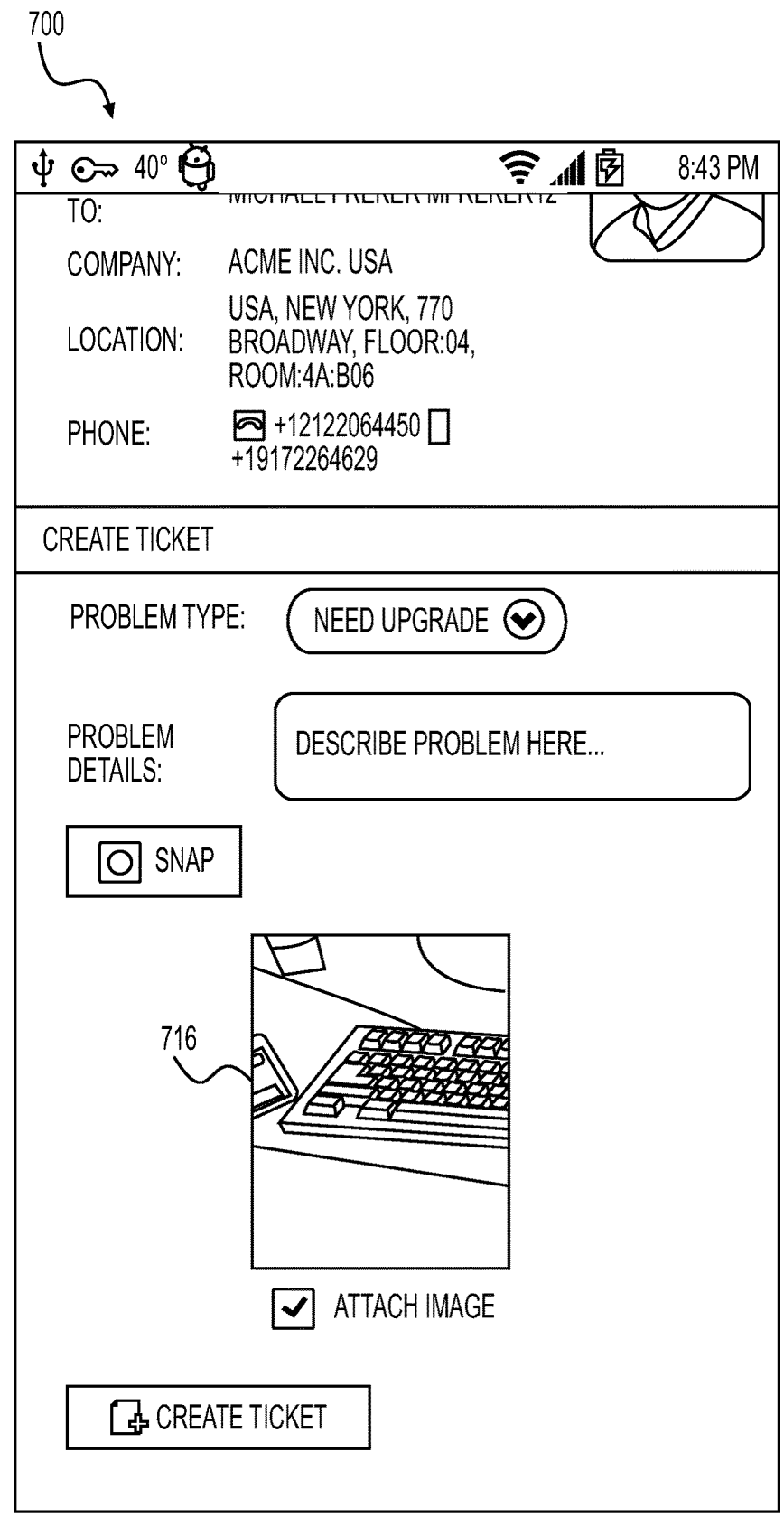
Figure 7D:
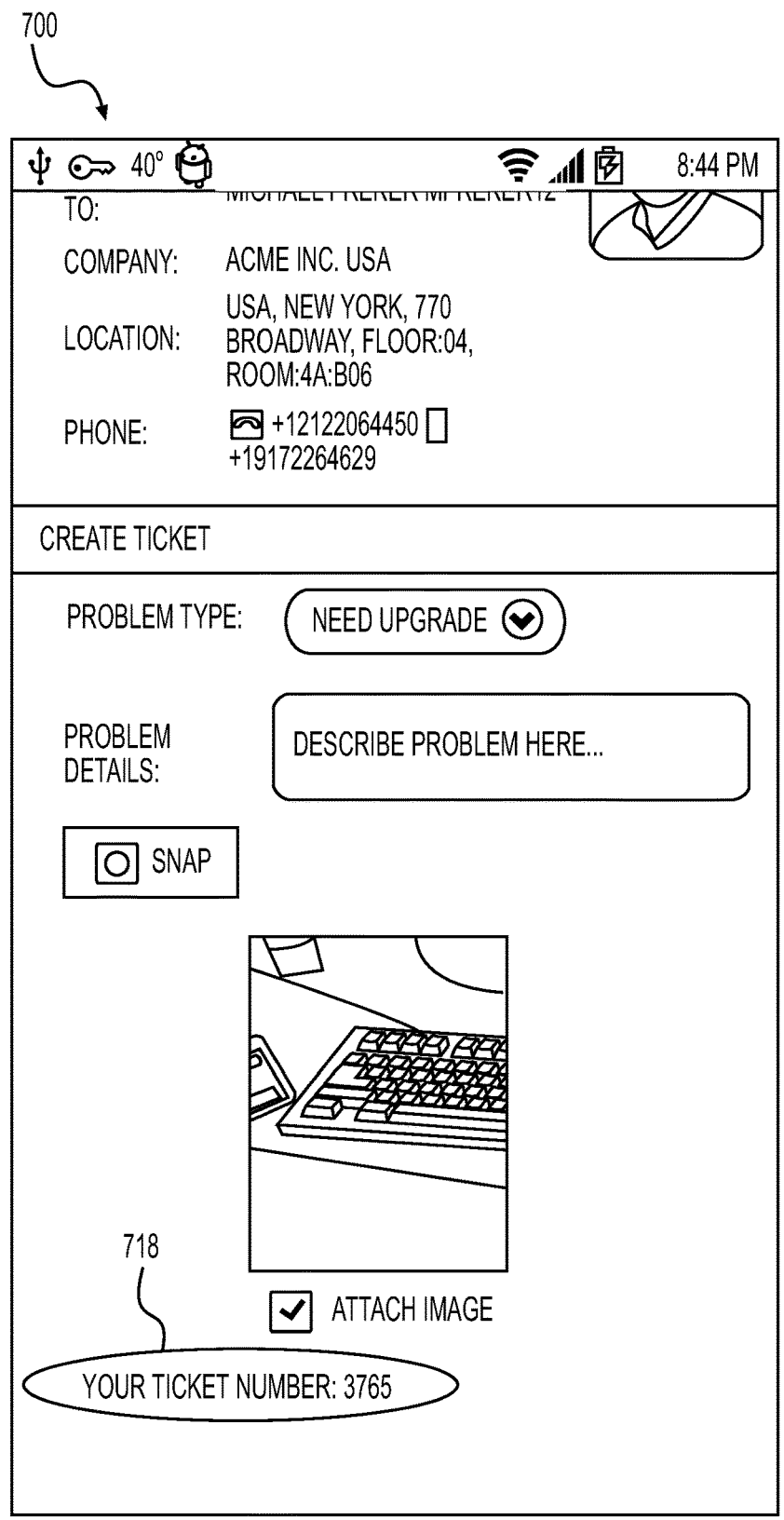

Accordingly, based on a user's interaction with the interfaces and user elements described and depicted with respect to FIGS. 7A-7C, system 100 of FIG. 2 may operate programmed instructions to execute a method of processing the user's request for service and/or generating a ticket to perform the user's requested service. For example, server systems 105 may receive the request from a user device 116, store the received information in databases 110, execute processors 112 to interact with one or more of HR server systems 102, IT server systems 104, asset server systems 106, and facilities server systems 108 to obtain relevant information from those systems, and generate suitable requests relating to the equipment. In addition, UI module(s) 114 may update a display of information, repair tickets, etc. on a display of a user's electronic device 116. For example, as shown in FIG. 7D, processor(s) 112 may interact with one or more of HR server systems 102, IT server systems 104, asset server systems 106, and facilities server systems 108 to generate a ticket, and interact with UI module(s) 114 to present a ticket and/or ticket number 718 to a user that requested the related service.

Figure 8A:
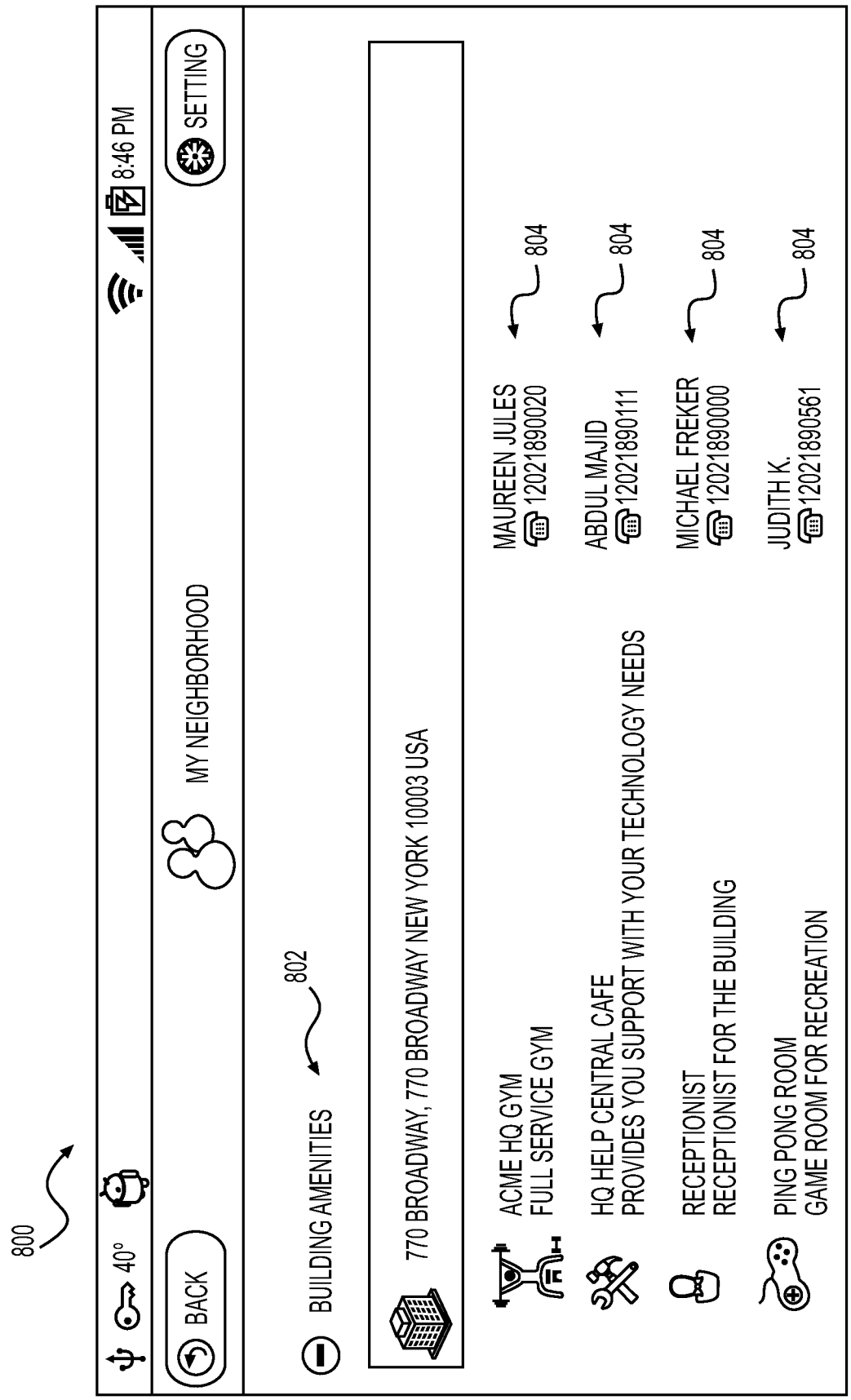
FIGS. 8A-8E are screenshots of an exemplary mobile application for enabling users to identify and submit information related to a request for information relating to a facility, according to an exemplary embodiment of the present disclosure.

FIGS. 8A-8E are screenshots of an exemplary mobile application for enabling users to identify and submit information related to a request for information relating to a facility, according to an exemplary embodiment of the present disclosure. Specifically, FIG. 8A depicts an exemplary mobile application interface 800 by which a user may submit a request for information relating to an asset or component of a facility. For example, a user may submit a request for information relating to available building amenities, equipment, directions, policies, etc. As shown in FIG. 8A, in one embodiment, a user may manipulate various user interface elements of interface 800 to generate and submit a request, for transmission through the user's electronic device 116. For example, a user may be presented with one or more user elements 804, which may be hyperlinks, buttons, or other mobile application elements that a user can select to initiate making a request for information. For example, as shown in FIG. 8A, a user may manipulate one or more of user elements 804 to issue requests for information relating to gyms, help centers, receptionists, game rooms, conference rooms, and so on. In one embodiment, the building amenities displayed in relation to user elements 804 may be sorted based on their respective location relative to a detected location of the user (i.e., with the closest building amenities listed first).

Figure 8B:
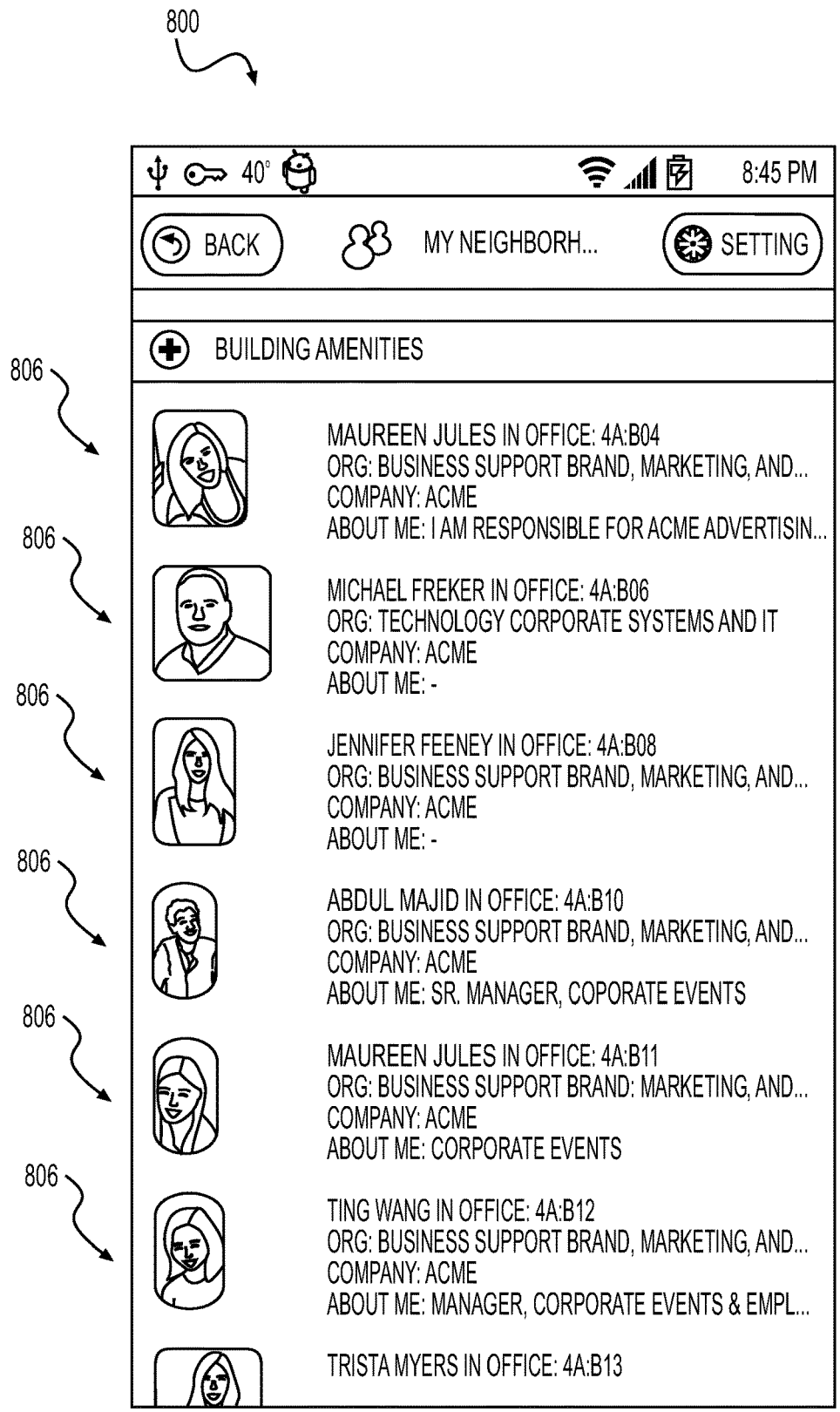

As shown in FIG. 8B, in one embodiment, the mobile application interface 800 may display indicia 806 representing individuals within some predetermined proximity of a detected location of the user. In one embodiment, the individuals displayed in relation to user elements 806 may be sorted based on their respective location relative to a detected location of the user (i.e., with the closest individuals listed first). In one embodiment, the displayed indicia 806 may include a name, office location, building location, phone number, or any other useful information stored in relation to the individual.

Figure 8C:
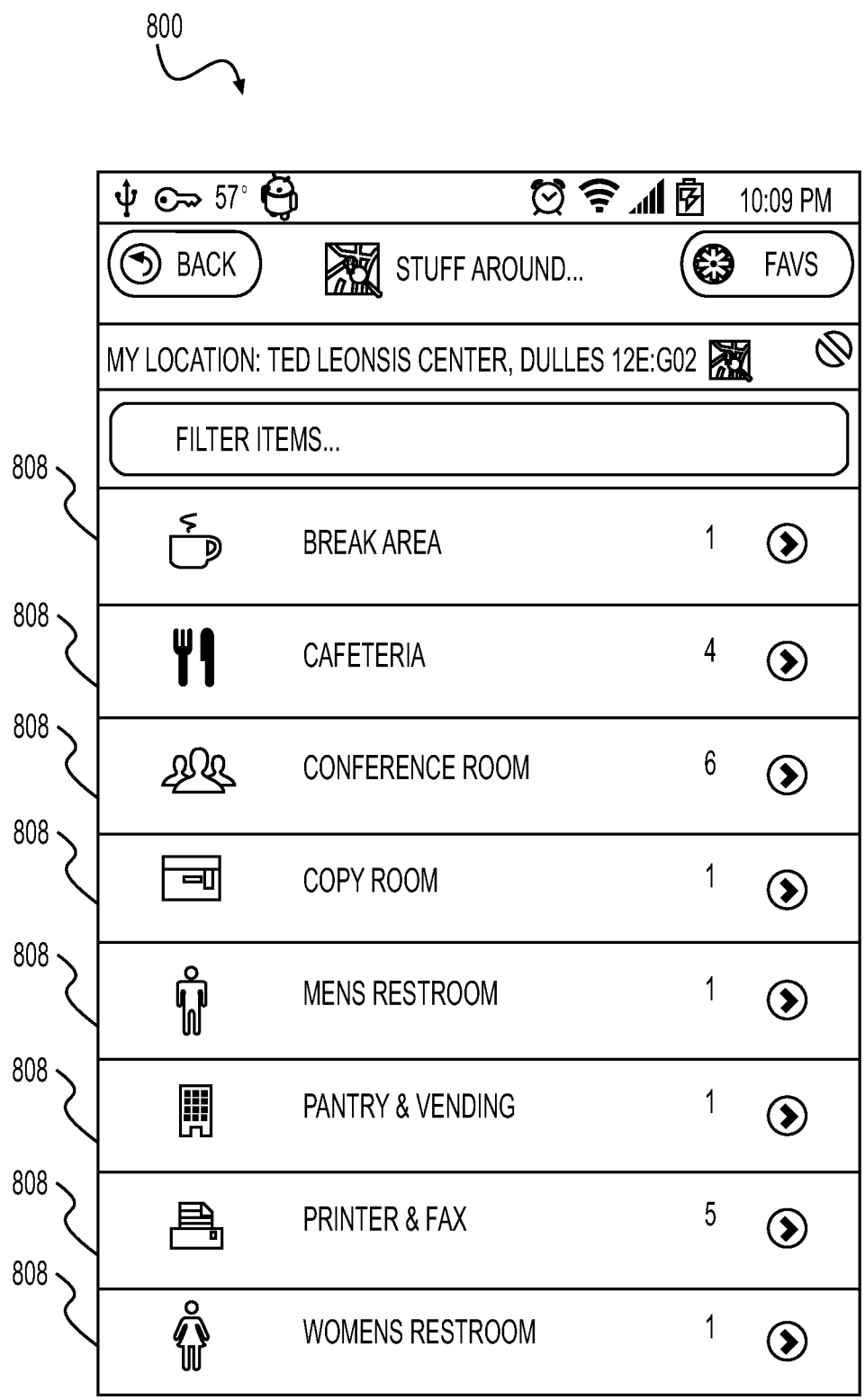

As shown in FIG. 8C, in one embodiment, the mobile application interface 800 may display indicia 808 representing amenities within some predetermined proximity of a detected location of the user. For example, the amenities may include break areas, cafeterias, conference rooms, copy rooms, restrooms, vending areas, printers, etc. In one embodiment, the amenities displayed in relation to user elements 808 may be sorted based on their respective location relative to a detected location of the user (i.e., with the closest building amenities listed first). In one embodiment, the displayed indicia 808 may include a name, office location, building location, phone number, or any other useful information stored in relation to the amenity.

Figure 8D:
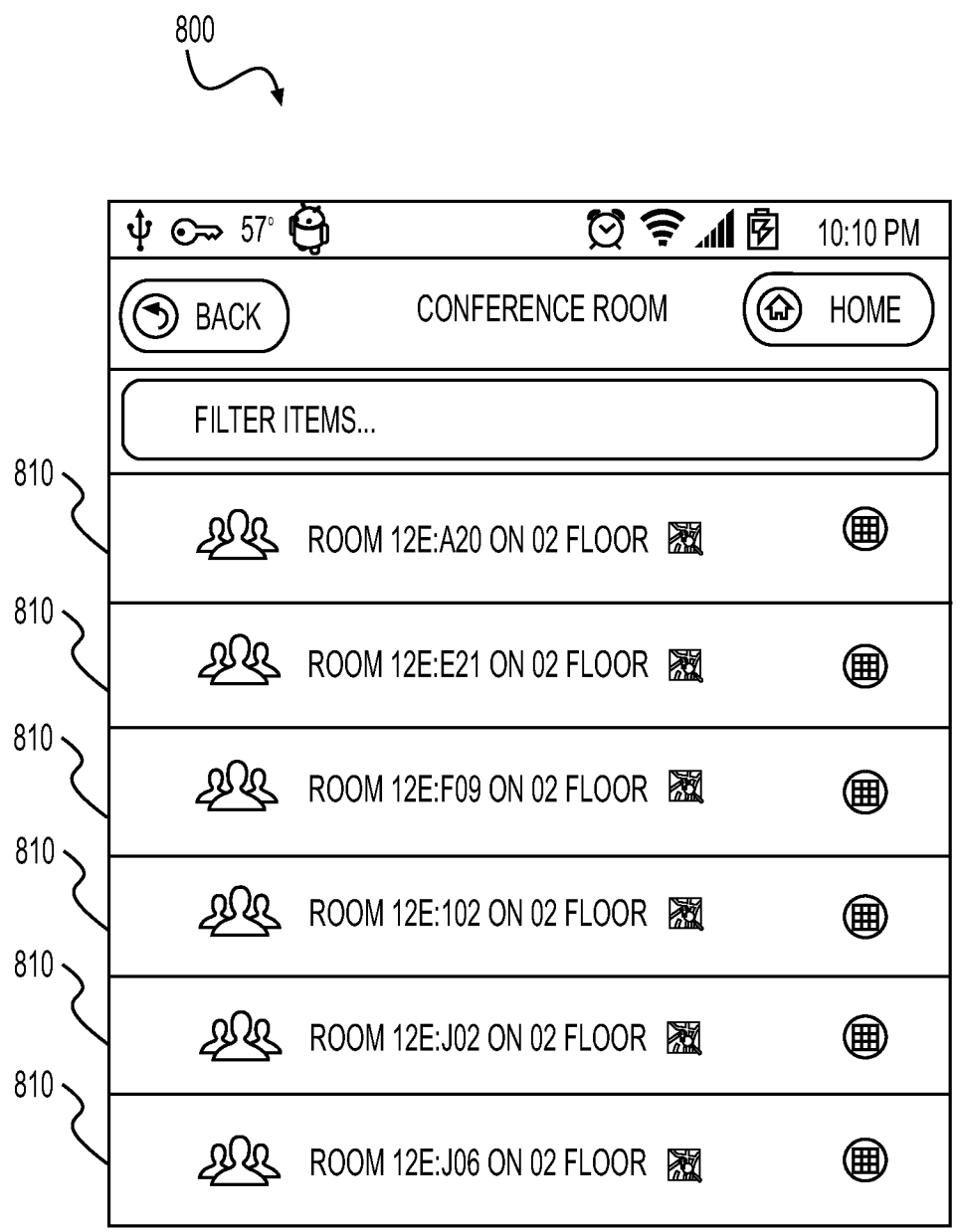

As shown in FIG. 8D, in one embodiment, the mobile application interface 800 may display indicia 810 representing facilities, rooms, or offices within some predetermined proximity of a detected location of the user. For example, the facilities may include any type of office or conference room. In one embodiment, the facilities displayed in relation to user elements 810 may be sorted based on their respective location relative to a detected location of the user (i.e., with the closest building facilities listed first). In one embodiment, the displayed indicia 810 may include a name, office location, building location, phone number, or any other useful information stored in relation to the facilities.

Figure 8E:
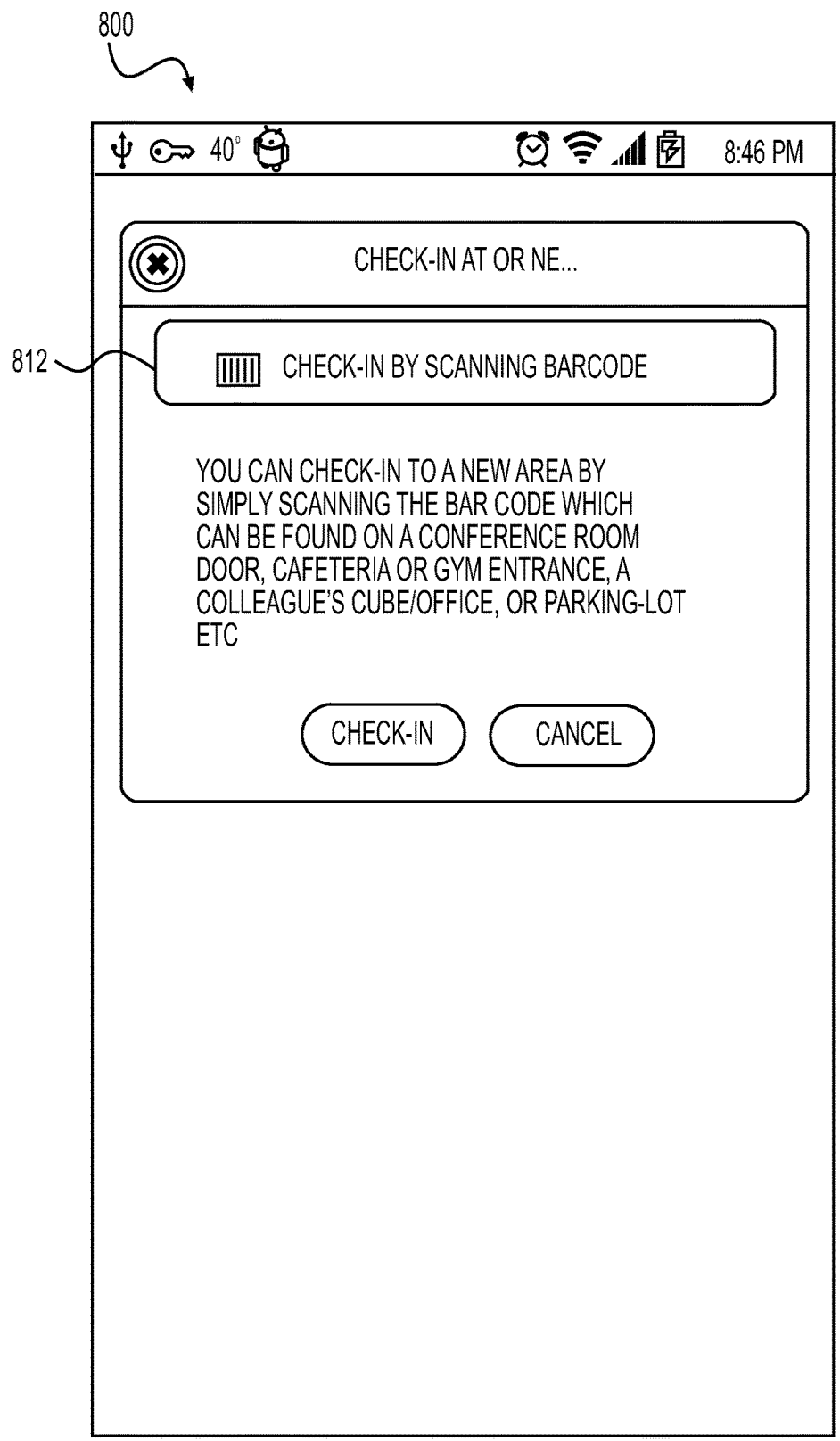

In one embodiment, as shown in FIG. 8E, a user may be able to manipulate the mobile application operating on the user's electronic device 116 to "check-in" to any desired location. For example, the user may publically or semi-publically associate himself or herself with some particular location by scanning a barcode (e.g., by manipulating user element 812 of interface 800) known to have a particular location. For example, the user may check-in to a particular office or conference room by scanning a barcode or QR code on the door or wall of that room. Alternatively, the user may check-in to the office or room by scanning a barcode or QR code on a piece of equipment in that room.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for enabling users to request information or services relating to a physical facility, the method comprising:
receiving an identifier of an asset or component within the physical facility, from a device that is associated with a user and configured to optically recognize the identifier and determine a location of the device within the physical facility;
accessing, based on the received identifier of the asset or component within the physical facility, a database to retrieve information about the asset or component;
authenticating an identity of the user;
displaying to the user, based on the received identifier and the authentication of the identity of the user, a prompt comprising one or more fields of information to be entered by the user;
receiving, from the user, interaction with the one or more fields of information;
displaying to the user, based on the identity of the user and the interaction with the one or more fields of information, one or more additional fields of information, the one or more additional fields of information being selected for display based on a location of the user and the identity of the user for the user to submit a request, such that one or more additional fields of information selected for display based on a first user identity are distinct from one or more additional fields of information selected for display based on a second user identity;
receiving, from the device associated with the user, a request for information or services relating to the physical facility, the request being one or more of: a request to receive information about the asset or component of the physical facility, and a request to receive maintenance of the asset or component of the physical facility, wherein the request includes an identifier associated with the user and the identifier associated with the asset or component of the facility;
accessing, based on the received request, a database storing one or more user identifiers and one or more identifiers associated with a plurality of assets or components of the physical facility based on the captured identifier and the detected location of the device within the physical facility;
if the request is a request for information about an asset or component of the physical facility, generating a presentation of information about the asset or component, based on the detected location of the device associated with the user and the captured identifier, the information including data or photos stored in the database in relation to an identifier associated with the asset or component based on the captured identifier and the detected location of the device within the physical facility, and transmitting the presentation of information to the user device;
if the request is a request for maintenance of an asset or component of the physical facility, generating a ticket for initiating maintenance of the asset or component, and storing the ticket in the database in relation to an identifier associated with the asset or component based on the captured identifier and the detected location of the device within the physical facility;
transmitting, to the device associated with the user, a status communication of the request to the user device after checking the status of the request; and
transmitting, to the device associated with the user, either the presentation of information about the asset or component of the physical facility, or a representation of the ticket for initiating maintenance of the asset or component of the physical facility.

2. The method of claim 1, further comprising:
generating the presentation of information or the ticket for initiating maintenance based on a detected location of the device associated with the user,
wherein the detection is performed based on one or more of: GPS data obtained from the device, radio frequency data obtained from the device, identification information obtained from the device, or a triangulation of the device by wireless access points in the physical facility.

3. The method of claim 1, wherein the physical facility is an office building, apartment building, commercial building, sporting venue, or music venue.

4. The method of claim 1, wherein the request for information is a request for information about facility amenities and locations of facility amenities within the physical facility.

5. The method of claim 1, wherein the request for information is a request for information about: locations of individuals within the physical facility or locations of individuals' offices or desks within the physical facility.

6. The method of claim 1, wherein the request for information includes a location of the user within the facility, and the request for information is request for information about locations of one or more amenities within the facility, each amenity being one of a break area, cafeteria, conference room, copy room, restroom, vending area, or gym, relative to the location of the user and,
wherein the information about the located amenities is displayed in a sorted order according to the proximity of each amenity to the location of the user.

7. The method of claim 1, wherein the request for information includes an identifier associated with the asset or component of the facility that is captured by the device associated with the user.

8. The method of claim 1, wherein the request for information includes an identifier associated with an office or desk of an individual that resides or works in the physical facility.

9. The method of claim 1, wherein the request to receive maintenance of an asset or component of the facility includes a photograph of the asset or component of the facility, the photograph being captured by the device associated with the user.

10. The method of claim 1, wherein the request to receive maintenance of an asset or component of the facility includes a selection of a type of problem experienced by the asset or component and an identifier associated with the asset or component.

11. A system for enabling users to request information or services relating to a physical facility, the system comprising:
a memory storage device storing instructions for enabling users to request information or services relating to a physical facility; and one or more processors configured to execute the instructions to perform a method including:
receiving an identifier of an asset or component within the physical facility, from a device that is associated with a user and configured to optically recognize the identifier and determine the location of the device within the physical facility;
accessing, based on the received identifier of the asset or component within the physical facility, a database to retrieve information about the asset or component;
authenticating an identity of the user;
displaying to the user, based on the received identifier and the authentication of the identity of the user, a prompt comprising one or more fields of information to be entered by the user;
receiving, from the user, interaction with the one or more fields of information;
displaying to the user, based on the identity of the user and the interaction with the one or more fields of information, one or more additional fields of information, the one or more additional fields of information being selected for display based on a location of the user and the identity of the user for the user to submit a request, such that one or more additional fields of information selected for display based on a first user identity are distinct from one or more additional fields of information selected for display based on a second user identity;
receiving, from the device associated with the user, a request for information or services relating to the physical facility, the request being one or more of: a request to receive information about the asset or component of the physical facility, and a request to receive maintenance of the asset or component of the physical facility, wherein the request includes an identifier associated with the user and the identifier associated with the asset or component of the physical facility;
accessing, based on the received request, a database storing one or more user identifiers and one or more identifiers associated with a plurality of assets or components of the physical facility based on the captured identifier and the detected location of the device within the physical facility;
if the request is a request for information about an asset or component of the physical facility, generating a presentation of information about the asset or component, based on the detected location of the device associated with the user and the captured identifier, the information including data or photos stored in the database in relation to an identifier associated with the asset or component based on the captured identifier and the detected location of the device within the physical facility, and transmitting the presentation of information to the user device;
if the request is a request for maintenance of an asset or component of the physical facility, generating a ticket for initiating maintenance of the asset or component, and storing the ticket in the database in relation to an identifier associated with the asset or component based on the captured identifier and the detected location of the device within the physical facility;
transmitting, to the device associated with the user, a status communication of the request to the user device after checking the status of the request; and
transmitting, to the device associated with the user, either the presentation of information about the asset or component of the physical facility, or a representation of the ticket for initiating maintenance of the asset or component of the physical facility.

12. The method of claim 1, further comprising:
generating the presentation of information or the ticket for initiating maintenance based on a detected location of the device associated with the user,
wherein the detection is performed based on one or more of: GPS data obtained from the device, radio frequency data obtained from the device, identification information obtained from the device, or a triangulation of the device by wireless access points in the physical facility.

13. The system of claim 11, wherein the physical facility is an office building, apartment building, commercial building, sporting venue, or music venue.

14. The system of claim 11, wherein the request for information is a request for information about facility amenities and locations of facility amenities within the physical facility.

15. The system of claim 11, wherein the request for information is a request for information about: locations of individuals within the physical facility or locations of individuals' offices or desks within the physical facility.

16. The system of claim 11, wherein the request for information includes a location of the user within the facility, and the request for information is request for information about locations of one or more amenities within the facility, each amenity being one of a break area, cafeteria, conference room, copy room, restroom, vending area, or gym, relative to the location of the user and,
wherein the information about the located amenities is displayed in a sorted order according to the proximity of each amenity to the location of the user.

17. The system of claim 11, wherein the request for information includes an identifier associated with the asset or component of the facility that is captured by the device associated with the user.

18. The system of claim 11, wherein the request to receive maintenance of an asset or component of the facility includes a photograph of the asset or component of the facility, the photograph being captured by the device associated with the user.

19. The system of claim 11, wherein the request to receive maintenance of an asset or component of the facility includes a selection of a type of problem experienced by the asset or component and an identifier associated with the asset or component.

20. A computer-readable medium storing instructions that, when executed by a processor, cause the processor to execute a method for enabling users to request information or services relating to a physical facility, the method comprising:
receiving an identifier of an asset or component within the physical facility, from a device that is associated with a user and configured to optically recognize the identifier and determine the location of the device within the physical facility;
accessing, based on the received identifier of the asset or component within the physical facility, a database to retrieve information about the asset or component;
authenticating an identity of the user;
displaying to the user, based on the received identifier and the authentication of the identity of the user, a prompt comprising one or more fields of information to be entered by the user;
receiving, from the user, interaction with the one or more fields of information;

displaying to the user, based on the identity of the user and the interaction with the one or more fields of information, one or more additional fields of information, the one or more additional fields of information being selected for display based on a location of the user and the identity of the user for the user to submit a request, such that one or more additional fields of information selected for display based on a first user identity are distinct from one or more additional fields of information selected for display based on a second user identity;

receiving, from the device associated with the user, a request for information or services relating to the physical facility, the request being one or more of:

a request to receive information about the asset or component of the physical facility, and a request to receive maintenance of the asset or component of the physical facility, wherein the request includes an identifier associated with the user and the identifier associated with the asset or component of the physical facility;

accessing, based on the received request, a database storing one or more user identifiers and one or more identifiers associated with a plurality of assets or components of the physical facility based on the captured identifier and the detected location of the device within the physical facility;

if the request is a request for information about an asset or component of the physical facility, generating a presentation of information about the asset or component, based on the captured identifier and the detected location of the device within the physical facility, the information including data or photos stored in the database in relation to an identifier associated with the asset or component based on the captured identifier and the detected location of the device within the physical facility, and transmitting the presentation of information to the user device;

if the request is a request for maintenance of an asset or component of the physical facility, generating a ticket for initiating maintenance of the asset or component, and storing the ticket in the database in relation to an identifier associated with the asset or component based on the captured identifier and the detected location of the device within the physical facility;

transmitting, to the device associated with the user, a status communication of the request to the user device after checking the status of the request; and transmitting, to the device associated with the user, either the presentation of information about the asset or component of the physical facility, or a representation of the ticket for initiating maintenance of the asset or component of the facility.

* * * * *

UNITED STATES PATENT AND TRADEMARK OFFICE
CERTIFICATE OF CORRECTION

| | |
|---|---|
| PATENT NO. | : 11,170,350 B2 |
| APPLICATION NO. | : 13/897438 |
| DATED | : November 9, 2021 |
| INVENTOR(S) | : Mohammed Abdul Majid, Michael Freker and Maureen Jules |

It is certified that error appears in the above-identified patent and that said Letters Patent is hereby corrected as shown below:

In the Claims

In Column 16, Line 3, Claim 12:
Delete "The method of claim 1, further comprising:"
And insert --The system of claim 11, wherein the processor is further configured for:--

Signed and Sealed this
Nineteenth Day of April, 2022

*Katherine Kelly Vidal*

Katherine Kelly Vidal
*Director of the United States Patent and Trademark Office*